United States Patent [19]

Uchida et al.

[11] 4,161,237
[45] Jul. 17, 1979

[54] VIBRATION ABSORBER FOR ROTATING BODY

[75] Inventors: Norio Uchida; Nakaba Komiyama, both of Yokohama, Japan

[73] Assignee: Tokyo Shibaura Electric Co., Ltd., Kawasaki, Japan

[21] Appl. No.: 886,888

[22] Filed: Mar. 15, 1978

[30] Foreign Application Priority Data

Mar. 22, 1977 [JP] Japan ................................. 52-31401

[51] Int. Cl.² ........................................................ F16F 15/16
[52] U.S. Cl. ......................................... 188/1 B; 74/5.5; 74/574; 308/139; 308/159
[58] Field of Search ................ 188/1 B; 308/159, 139; 74/5.5, 574, 5.8; 58/140 A

[56] References Cited

U.S. PATENT DOCUMENTS

| 2,720,077 | 10/1955 | Stein | 308/159 X |
|---|---|---|---|
| 2,886,943 | 5/1959 | Huguenin | 58/140 A |
| 3,216,655 | 11/1965 | Wind et al. | 308/159 X |
| 3,464,290 | 9/1969 | Brink | 188/1 B |

FOREIGN PATENT DOCUMENTS 49-64746 6/1974 Japan.

OTHER PUBLICATIONS

Zippe, Gernot., *The Development of Short Bowl Ultracentrifuges,* U.S. Atomic Energy Commission, Jun. 15, 1960, Contract AT-(40-1)-2400.

*Primary Examiner*—George E. A. Halvosa
*Attorney, Agent, or Firm*—Oblon, Fisher, Spivak, McClelland & Maier

[57] ABSTRACT

A vibration absorber for rotating body of this invention comprises a disc capable of moving only in the horizontal direction accompanying the vibration of a pivot and an annular plate placed on the disc and capable of moving only in the vertical direction, the vibration energy of rotating body being absorbed by the shearing force of an oil film formed by the relative motion between the horizontally moving disc and the vertically moving annular plate.

8 Claims, 3 Drawing Figures

VIBRATION ABSORBER FOR ROTATING BODY

This invention relates to a vibration absorber for rotating body capable of easily damping the vibration of a rotating body rotating at a high speed.

In general, if the speed of rotation of a rotating body exceeds its critical speeds or the whirling force of the rotating body becomes larger, the rotating body will be subjected to large vibration. Therefore, a vibration absorber has been generally used for absorbing the vibration of the rotating body. Heretofore, there have been proposed various types of vibration absorber including one in which a squeezing action is applied to a gap between the side wall of an oil tank and a damper moving member to damp the motion of the moving member, for example. This type of absorber, however, is subjected to a defect that cavitation is liable to be caused in the oil film in the gap, decreasing the damping effect when the vibration of the rotating body is increased. In order to eliminate the above defect of the absorber, there are performed various modifications of such absorber, but they generally are subjected to complication of construction.

An object of this invention is to provide a vibration absorber for rotating body utilizing as the damping effect a shearing action instead of utilizing a squeezing action and characterized by a simple construction and ease of working and assembling as well as by its high damping capability.

Illustrative embodiments of this invention will be described in detail in connection with the accompanying drawings, wherein.

Figure 1:
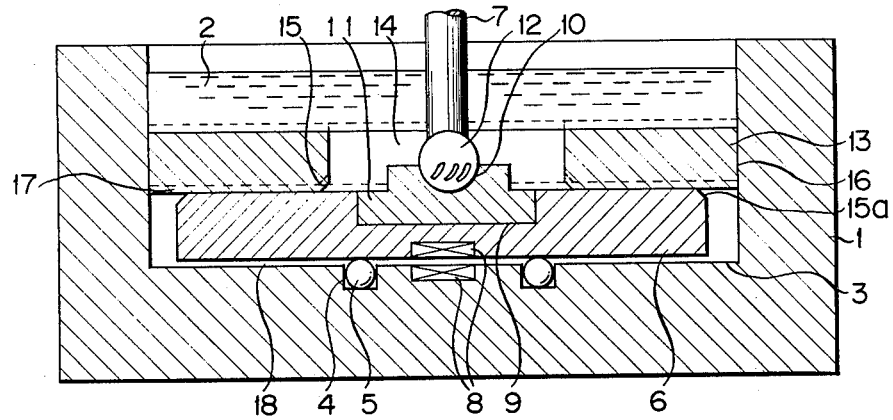
FIG. 1 is a sectional view of a vibration absorber for rotating body according to a first embodiment of this invention.

Referring now to FIG. 1, which shows the sectional view of the vibration absorber according to the first embodiment of this invention, a lubricating oil 2 is contained in an oil tank 1. An annular groove 4 are bored in a bottom face 3 of the oil tank 1, steel balls 5 being held in the groove 4. These balls 5 prevents disc 6 capable of moving only in the horizontal direction from coming into contact with the bottom face 3 of the oil tank 1, facilitaing the horizontal motion of the disc 6. The outer periphery of the top face of the disc 6 is provided with a regular chamfer 15a. Further, there is provided a centripetal means for applying centripetal force to the horizontal motion of the disc 6. For such centripetal means, magnets 8 are disposed facing each other on the disc 6 and the bottom face 3 of the oil tank 1. The magnets 8 are provided with N and S poles, respectively, attracting each other.

Formed in the center of the horizontally moving disc 6 is a recess 9, in which a convex bearing member 11 with a hemispherical seat 10 is fitted. Alternatively, the bearing member 11 may be fitted within the top face of the disc 6. Although the bearing member 11 and horizontally moving disc 6 may be formed of the same material, they should preferably be made of different materials. The hemispherical seat 10 is so formed as to be fitted with the lower portion of a spherical surface 12 formed at the lower end of a vertically extending pivot 7. On the other hand, the upper end of the pivot is connected to the lower portion of a rotating body. A plurality of spiral grooves are formed on either the hemispherical seat 10 or the bottom face of the spherical surface 12 of the pivot 7, shown in FIG. 1, and an oil film is formed between the hemispherical seat 10 and spherical surface 12 by the rotation of the pivot 7, receiving load in the radial direction and a direction perpendicular to the radial direction.

Placed on the top surface of the horizontally moving disc 6 is an annular plate 13 capable of freely moving up and down whose horizontal motion is restricted by the engagement with the oil tank 1. A hole 14 is bored through the center of the annular plate 13, whose bottom-side outer periphery facing the hole 14 is provided with a regular chamfer 15. The bearing member 11 and pivot 7 are located in the hole 14.

Further, a gap 16 of e.g. scores of microns is formed between the outer side face of the annular plate 13 and the inner side face of the oil tank 1 so that these two faces may not come into contact with each other, the annular plate 13 being so restricted as not to move in the horizontal direction.

Thus, in the vibration absorber for rotating body with the aforementioned construction, when the pivot 7 vibrates accompanying the acceleration of the rotation of the rotating body, the horizontally moving disc 6 vibrates on a plane perpendicular to the pivot 7 by means of the pivot bearing members 11 and 12. Meanwhile, the horizontal motion of the annular plate 13 is restricted, so a relative motion in the horizontal direction is caused between the horizontally moving disc 6 and the vertically annular plate 13. At this point of time, the chamfers 15 and 15' on the annular plate 13 and the disc 6 produce a "wedge" effect to form an oil film in gap 17 and lift up the annular plate 13, thus applying to the horizontally moving disc 6 a force F given as follows:

$$F = \mu(A/h)U = CU$$

Here $\mu$: coefficient of viscosity, h: displacement (clearance),

A: area of a portion where the horizontally moving plate 6 and vertically moving annular plate 13 face each other, U: vibration speed of the horizontally moving disc, C: damping coefficient.

The force F is transmitted to the rotating body through the horizontally moving disc 6 and pivot bearing members 11 and 12 to damp the vibration. Moreover, the viscosity resistance of such oil film is produced also in a gap 18 between the bottom face of the oil tank 1 and the horizontally moving disc 6.

Thus, the vibration of the rotating body may be absorbed by the dissipation of the kinetic energy of the horizontally moving disc 6 by means of the shearing force caused in the films of lubricating oil flowing into the gaps 17 and 18. In this case, the checking or damping power increases as the gaps 17 and 18 are reduced.

Figure 2:
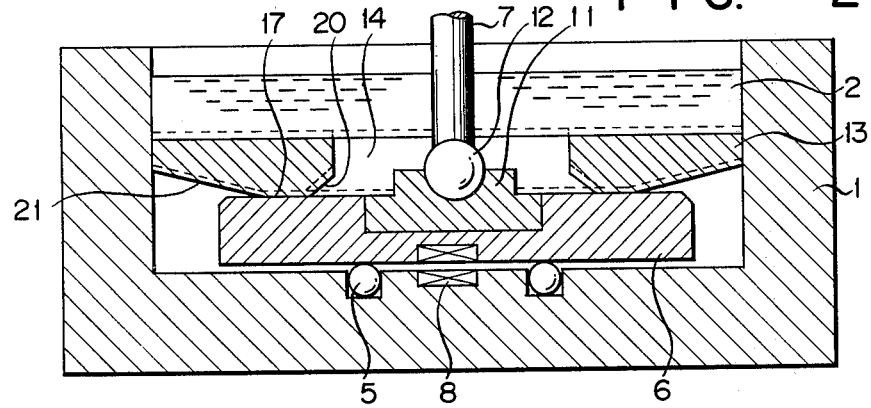
FIG. 2 is a sectional view of a vibration absorber for rotating body according to a second embodiment of the invention.

FIG. 2 is the sectional view of the vibration absorber according to the second embodiment of the invention. In this drawing the same parts as those of FIG. 1 are denoted by like reference numerals, and excluded from the detailed description hereinafter. This embodiment may be distinguished from the first embodiment as shown in FIG. 1 in that bevels 20 and 21 at positively fixed angles are formed at the bottom-side outer peripheries of the vertically moving annular plate 13. These bevels may be formed also at the top-side outer peripheries of the horizontally moving disc 6. Thus, the wedge-shaped regions between the horizontally moving disc 6 and the vertically moving annular plate 13 may be enlarged by separately providing both the disc 6 and the annular plate 13 with the bevels 20 and 21, so that the bevel 20 on the vertically moving annular plate 13 may easily be subjected to the bearing action. Consequently, the vertically moving annular plate 13 my easily be lifted up, thereby easily creating a gap between both the disc 6 and the plate 13. Accordingly, like the case of the device of the first embodiment, a damping effect may easily be obtained by means of a shearing force of the lubricating oil in the gap. The width of the gap to form the oil film may be selected optionally according to the angles of the bevels 20 and 21; the width at the center may be minimized, while the width at the outer periphery may be enlarged.

Figure 3:
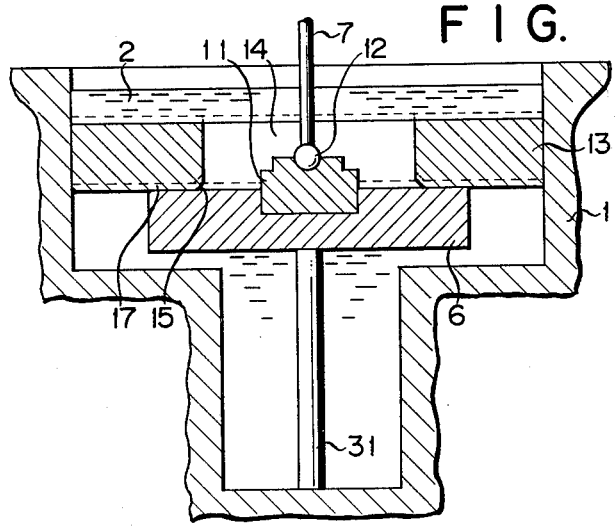
FIG. 3 is a sectional view of a vibration absorber for rotating body according to a third embodiment of the invention.

FIG. 3 is the sectional view of the vibration absorber according to the third embodiment of the invention. In this drawing the same parts as those of FIG. 1 are denoted by like reference numbers, and excluded from the detailed description hereinafter. This embodiment may be distinguished from the first embodiment as shown in FIG. 1 by the centripetal means for locating during operation the center of the horizontally moving disc 6 on the central axis of the pivot 7. In FIG. 3, the centripetal means is a cantilever 31 extending from the center of the bottom face of the oil tank 1. One end of the cantilever 31 is attached to the central portion of the bottom face, while the other end is attached to the central portion of the horizontally moving disc 6. Thus, the cantilever 31 can always maintain the center of the disc 6 located on the central axis of the pivot 7, as though the disc 6 moves in the horizontal direction. The device of this embodiment may be operated in the same manner as the devices of the aforesaid embodiments.

As described above, in the device of this invention, the vibration of the rotating body may be absorbed by applying the shearing force produced by the relative motion of the horizontally moving disc and vertically moving plate to the oil film formed in the gap between these two plates. Moreover, according to the invention, the device has a simple construction in which the annular plate capable of moving only in the vertical direction is placed on the horizontally moving disc, and the gap may easily be formed automatically between these two plates without requiring any special means, so that manufacturing and assembling of the device members are very easy. Furthermore, the shearing force is utilized for the damping effect, so that even a relatively large vibration may effectively be absorbed.

What we claim is:

1. A vibration absorber for a rotating body comprising a tank including at least side and bottom portions and containing a viscous liquid substantially filling said tank, a spherical surface formed at one end of a vertically extending pivot, a first member located adjacent the bottom of said tank and having a partially spherical surface to fit on said spherical surface of the pivot and capable of moving in the horizontal direction, a hollow second member placed on top of said first member and capable of moving in the vertical direction independently of the horizontal movement of said first member, and a centripetal means for locating the center of said first member on the central axis of said pivot upon moving said first member in the horizontal direction, all of said members and means being disposed within said tank.

2. A vibration absorber for rotating body according to claim 1, wherein said viscous liquid is oil.

3. A vibration absorber for rotating body according to claim 1, wherein either said spherical surface of the pivot or the spherical surface of said first member is provided with a plurality of spiral grooves.

4. A vibration abosrber for rotating body according to claim 3, wherein the spherical surface of said first member protrudes from the top face of said first member.

5. A vibration absorber for rotating body according to claim 1, wherein a member having the spherical surface of said first member is made of a material different from that of said first member.

6. A vibration absorber for rotating body according to claim 1, wherein a bevel is formed at least on the lower-side outer periphery of said second member.

7. A vibration absorber for rotating body according to claim 1, wherein said centripetal means inludes magnets disposed facing each other at the central portion of the lower face of said first member and the corresponding portion of the bottom face of said tank, and attracting each other.

8. A vibration absorber for rotating body according to claim 1, wherein said centripetal means is a cantilever located on the central axis of said pivot and coupling the bottom face of said tank with the lower face of said first member.

* * * * *